United States Patent
Lou

(10) Patent No.: US 7,073,080 B2
(45) Date of Patent: Jul. 4, 2006

(54) SYSTEM AND METHOD FOR DYNAMICALLY REGULATING VOLTAGE IN A WIRELESS INTERFACE DEVICE WHILE MAINTAINING AN ACCEPTABLE BIT ERROR RATE

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 573 days.

(21) Appl. No.: 10/329,728

(22) Filed: Dec. 26, 2002

(65) Prior Publication Data

US 2004/0025065 A1 Feb. 5, 2004

Related U.S. Application Data

(60) Provisional application No. 60/399,961, filed on Jul. 31, 2002.

(51) Int. Cl.
*G06F 1/26* (2006.01)
*H04B 10/08* (2006.01)
*H04B 10/04* (2006.01)

(52) U.S. Cl. .................... 713/320; 398/27; 398/197

(58) Field of Classification Search ............... 713/320, 713/310, 300; 455/343.1, 343.2; 398/27, 398/197

See application file for complete search history.

(56) References Cited

U.S. PATENT DOCUMENTS

| | | | |
|---|---|---|---|
| 5,808,760 A * | 9/1998 | Gfeller ........................ 398/27 |
| 5,950,120 A * | 9/1999 | Gardner et al. .......... 455/343.1 |
| 6,222,660 B1 * | 4/2001 | Traa ........................... 398/213 |
| 6,725,060 B1 * | 4/2004 | Chhatriwala et al. .... 455/556.2 |

\* cited by examiner

*Primary Examiner*—Thomas Lee
*Assistant Examiner*—Suresh K Suryawanshi
(74) *Attorney, Agent, or Firm*—Garlick Harrison & Markison LLP

(57) ABSTRACT

A method and apparatus for dynamically managing power in a wireless interface device while maintaining an acceptable bit error rate. The wireless interface device includes a wireless interface unit, a bit error detection unit that monitors the bit error rate a data stream in the wireless interface unit, a processing unit, and a power management unit. The power management unit operates in a conjunction with the processing unit and the bit error detection unit to monitor the bit error rate and to dynamically adjust the voltage levels in the wireless interface unit to ensure that the bit error rate remains in an acceptable range.

21 Claims, 11 Drawing Sheets

SYSTEM AND METHOD FOR DYNAMICALLY REGULATING VOLTAGE IN A WIRELESS INTERFACE DEVICE WHILE MAINTAINING AN ACCEPTABLE BIT ERROR RATE

CROSS REFERENCE TO RELATED APPLICATION

This application claims priority to U.S. Provisional Application Ser. No. 60/399,961, filed Jul. 31, 2002, which is incorporated herein by reference in its entirety for all purposes.

BACKGROUND

1. Technical Field

The present invention relates generally to digital computers and communications systems and, more particularly, systems for managing bit error rates in wireless interface devices coupled to digital computers and communications systems.

2. Related Art

Wireless communication technology has advanced rapidly over the past few years. One of the most promising areas for the use of wireless technology relates to communications between input/output devices and their "host" computers. For example, wireless keyboards and mice now couple via wireless connections to their host computers. These "wireless" input devices are highly desirable since they do not require any hard-wired connections with their host computers. However, the lack of a wired connection also requires that the wireless input devices contain their own power supply, i.e., that they be battery powered. In order to external the life of their batteries the wireless input devices often support power saving modes of operation. Some techniques for conserving power, however, can cause degradation in the performance of various system components in the wireless interface.

Bit error rate is a measure of the quantity of data transmission between various components in a communication or computer system. Many power conversion techniques used in wireless interfaces tend to cause unacceptably high bit error rates because the bit error rate is not properly monitored when power levels are changed for the various system components. Thus, there is a need in the art for a wireless input device that has a power management system capable of conserving battery power while maintaining a sufficiently low bit error rate to ensure adequate quality of service for extended periods of time.

SUMMARY OF THE INVENTION

The dynamic voltage regulation system of the present invention overcomes the shortcomings of the prior art by providing a method and apparatus for dynamically managing power in a wireless interface while maintaining an acceptable bit error rate. The wireless interface device includes a wireless interface unit, a processing unit, an input/output unit, and a power management unit. The wireless interface unit wirelessly interfaces with the wirelessly enabled host using a communication interface protocol. In an embodiment described herein, this communication interface protocol is the Bluetooth communication interface protocol. However, other communication protocols can also be employed with the present invention.

The power management unit operably couples to the wireless interface unit, the processing unit, and the input/output unit. The power management unit operates to control the power consumption of the wireless interface device and the processing unit. The power management unit works in conjunction with a processing unit to monitor the bit error rate and to dynamically adjust the voltage levels in the wireless interface to ensure that the bit error rate remains in an acceptable range.

In performing its power management unit operations, the power management unit enters a power down mode in which it powers down the wireless interface unit and the processing unit. In the power down mode of operation, battery consumption of the wireless interface device is significantly reduced. However, in the power down operation, the input/output unit remains powered such that it can receive input from a coupled user input device. The input/output unit indicates to the power management unit when it receives any user input. When user input is received, the input/output unit notifies the power management unit that activity has commenced. In response, the power management unit powers up the wireless interface unit and the processing units so that the input can be relayed to the wirelessly enabled host.

Other aspects of the present invention will become apparent with further reference to the drawings and specification, which follow.

DETAILED DESCRIPTION

Figure 1A:
FIG. 1A is a system diagram illustrating a PC host and a wireless mouse that includes a wireless interface device constructed according to the present invention.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
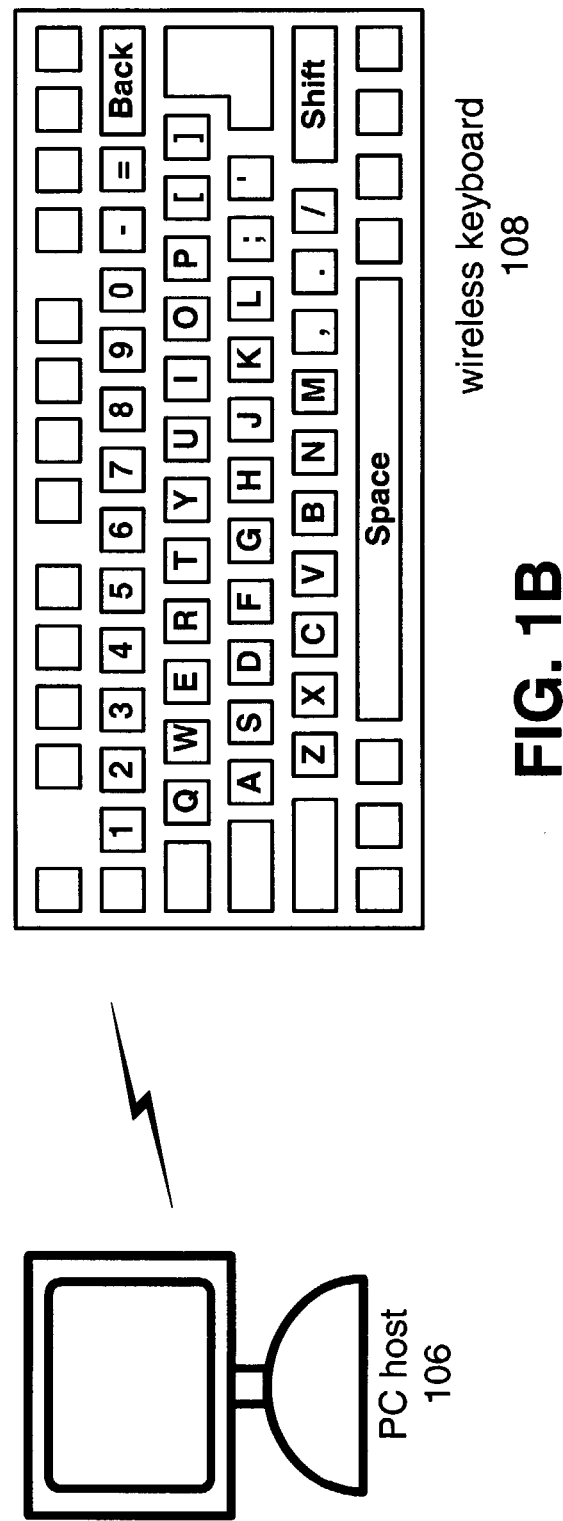
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods of time on a single set of batteries because of the greatly reduced power consumption operations according to the present invention.

Figure 2:
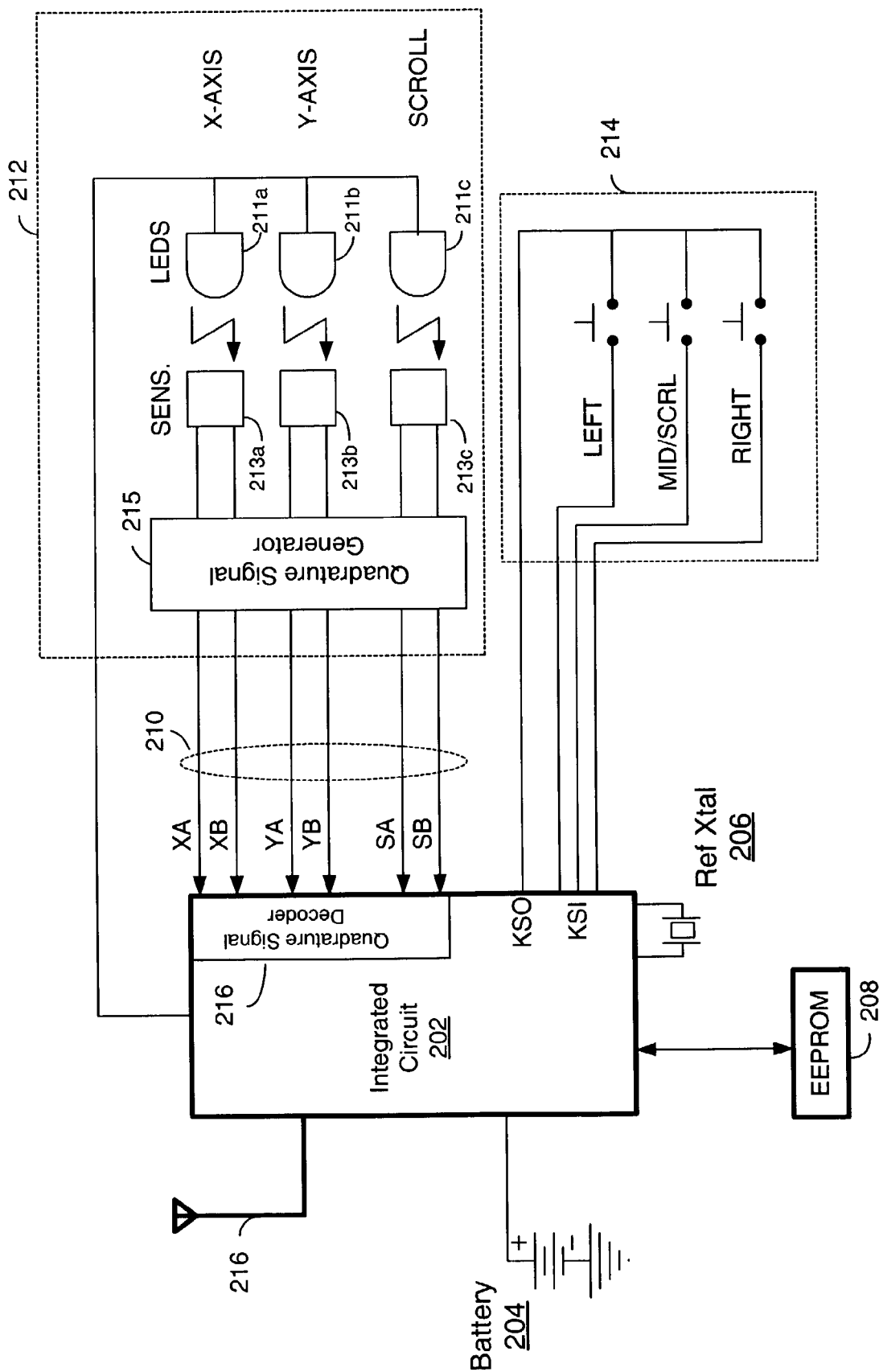
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202.

Integrated circuit 202 also couples to battery 204, crystal 206 that produces a reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
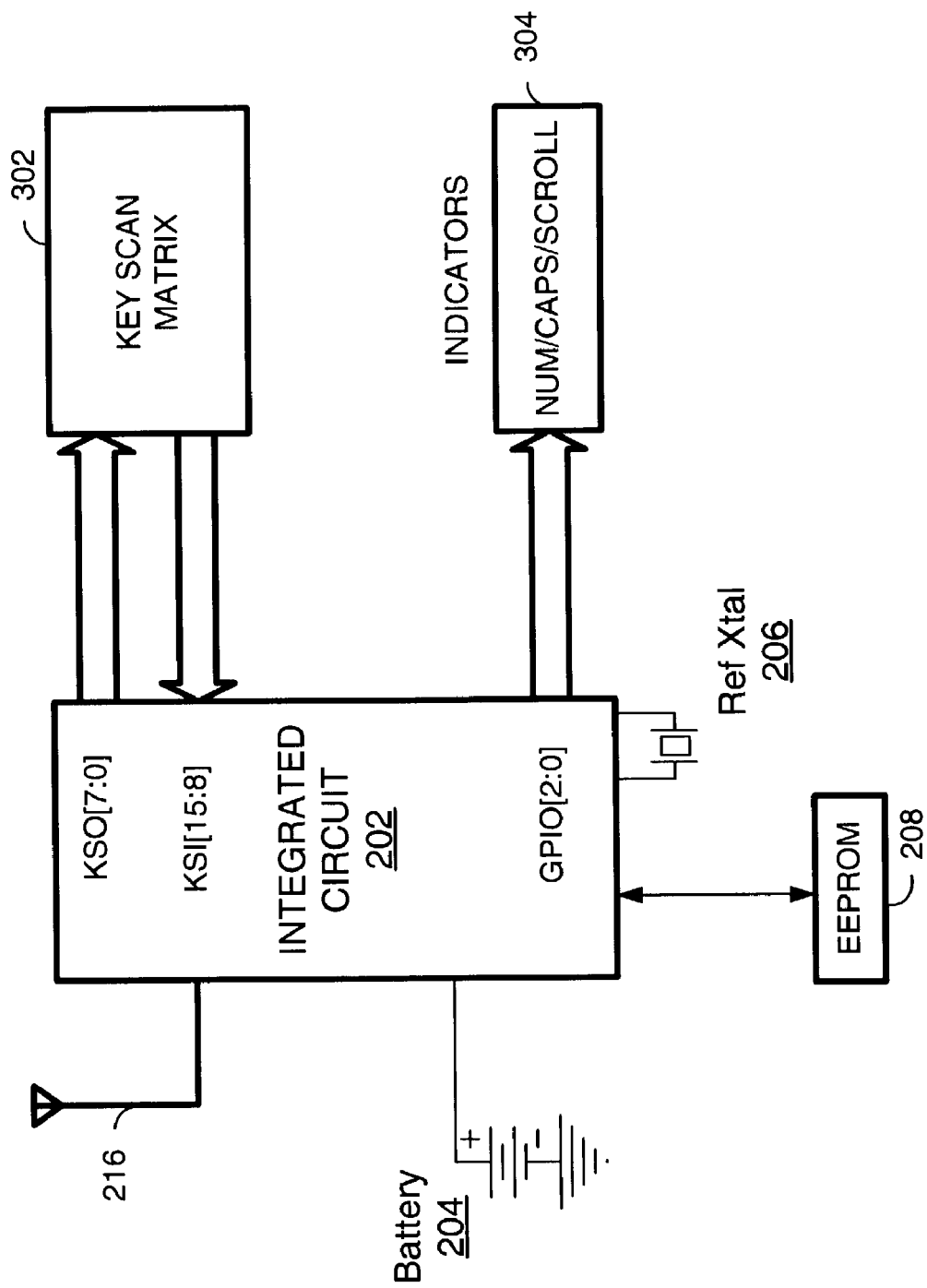
FIG. 3 is a schematic block diagram illustrating the structure of a wireless keyboard that includes a wireless interface device constructed according to the present invention.

FIG. 3 is a schematic block diagram illustrating the structure of a wireless key matrix scan circuit 302 that operates in conjunction with a wireless interface device (integrated circuit 202) constructed according to the present invention. As shown in FIG. 3, integrated circuit 202 services a key scan matrix 302 that provides inputs from the keyboard. Indicates 304 include number, capitals, and scroll lights that are lit on the keyboard. The integrated circuit 202 couples to a battery 204, a crystal 206, an EEPROM 208, and an antennas 216.

In another embodiment (not shown in either FIG. 2 or FIG. 3), the integrated circuit 202 services both mouse and keyboard inputs and may reside internal to either the mouse or the keyboard. As will be apparent to those skilled in the art, multiplexing or signal sharing may be required, because the input signals differ. However, different signal lines may be dedicated for keyboard and for mouse inputs such that no signal sharing is required. As is apparent, when the integrated circuit 202 alone services both mouse and keyboard input wired connectivity between the keyboard and the mouse is required.

Figure 4:
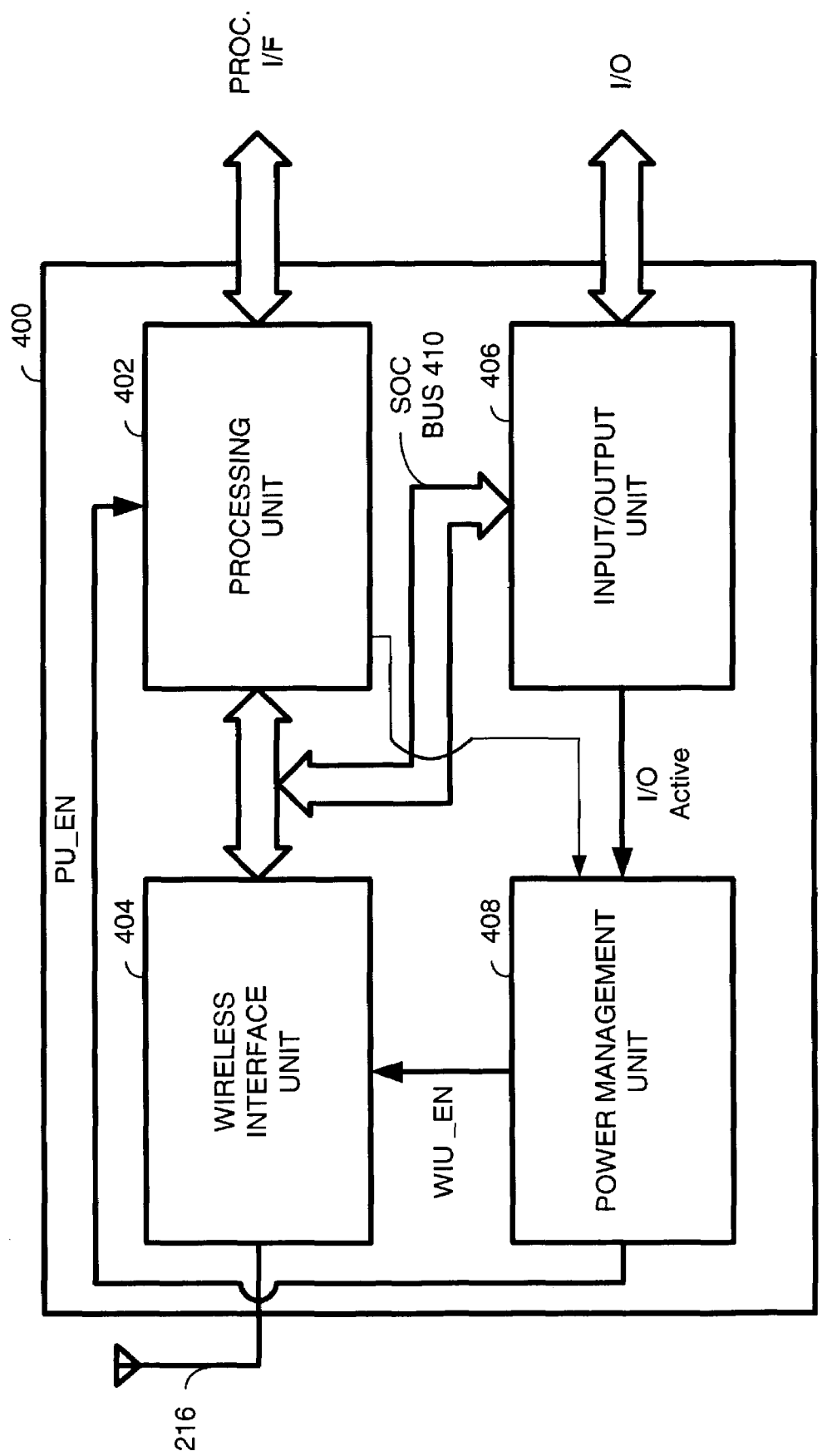
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 can be adapted to operate according to the Bluetooth specification and in particular to the Human Interface Device (HID) portion of the Bluetooth specification. It will be understood by those skilled in the art, however, that the present invention can be adapted to work in conjunction with other wireless interface standards.

Processing unit 402, wireless interface unit 404, and input/output unit 406 couple with one another via a system on a chip (SOC) but 410. Processing unit 402 includes a processing interface that may be used to couple the processing unit to one or more devices. Input/output unit 406 includes an input/output set of signal lines that couple the wireless interface device 400 to at least one user input device, such as a mouse or the keyboard.

Figure 5:
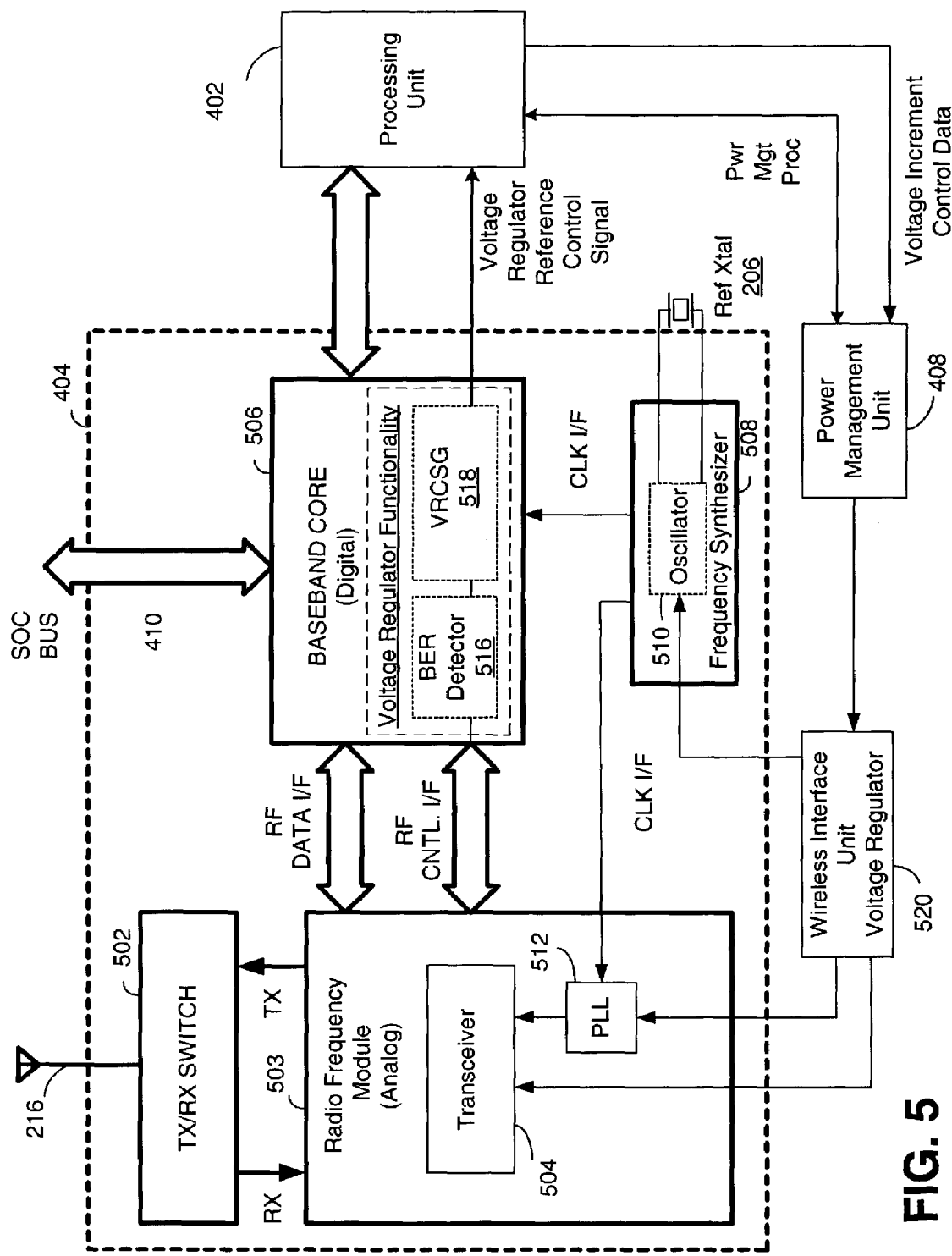
FIG. 5 is a block diagram illustrating a wireless interface unit of the wireless interface device of FIG. 4.

FIG. 5 is a block diagram illustrating a wireless interface unit of the wireless interface device of FIG. 4. The wireless interface unit 404 includes a transmit/receive switch 502, a radio frequency module 503 that comprises a 2.4 GHz transceiver 504, a baseband core 506 which may be compatible with the Bluetooth standard, and a frequency synthesizer 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506. Such coupling is performed via an RF control interface and an RF data interface. The RF control interface performs the necessary control operations to guaranty that the 2.4 GHz transceiver 504 and the baseband core 506 will operate consistently within desired operating specifications. The RF data interface transfer both Rx and Tx data between the 2.4 GHz transceiver 504 and the baseband core 506. Frequency synthesizer 508 comprises an oscillator 510 that couples to the external crystal 206 and to the phase-locked loop (PLL) 512. The frequency synthesizer 508 is controlled to provide an RF frequency for the 2.4 GHz transceiver 504 which is used to mix with the baseband signal received from the baseband core during a transmit operation and to mix with the received RF signal during a receive operation. The frequency synthesizer 508 operates in conjunction with the power management unit 408, via the wireless interface unit voltage regular 520, to provide different clock signals corresponding to different power states as discussed hereinbelow.

The baseband digital unit performs certain voltage regulator functionality to assist in power management functions. Specifically, a bit error rate detector 516 and a voltage regulator control signal generator 518 within the baseband core 506 cooperate to detect operation of the transceiver in the RF analog module 503 and to generate a voltage regulator reference control signal for use by the processing unit 402 to process data for the power management unit 408. As will be discussed in greater detail below, the bit error data detector 516 in combination with the power management unit 408 provide a means to selectively adjust the voltage provided by the wireless interface voltage regulator to ensure that the wireless interface is operating in an acceptable range of bit error rate while reducing the amount of power used. The operation of the system illustrated in FIG. 5 will be discussed in greater detail below in the flowchart of FIG. 11.

Figure 6:
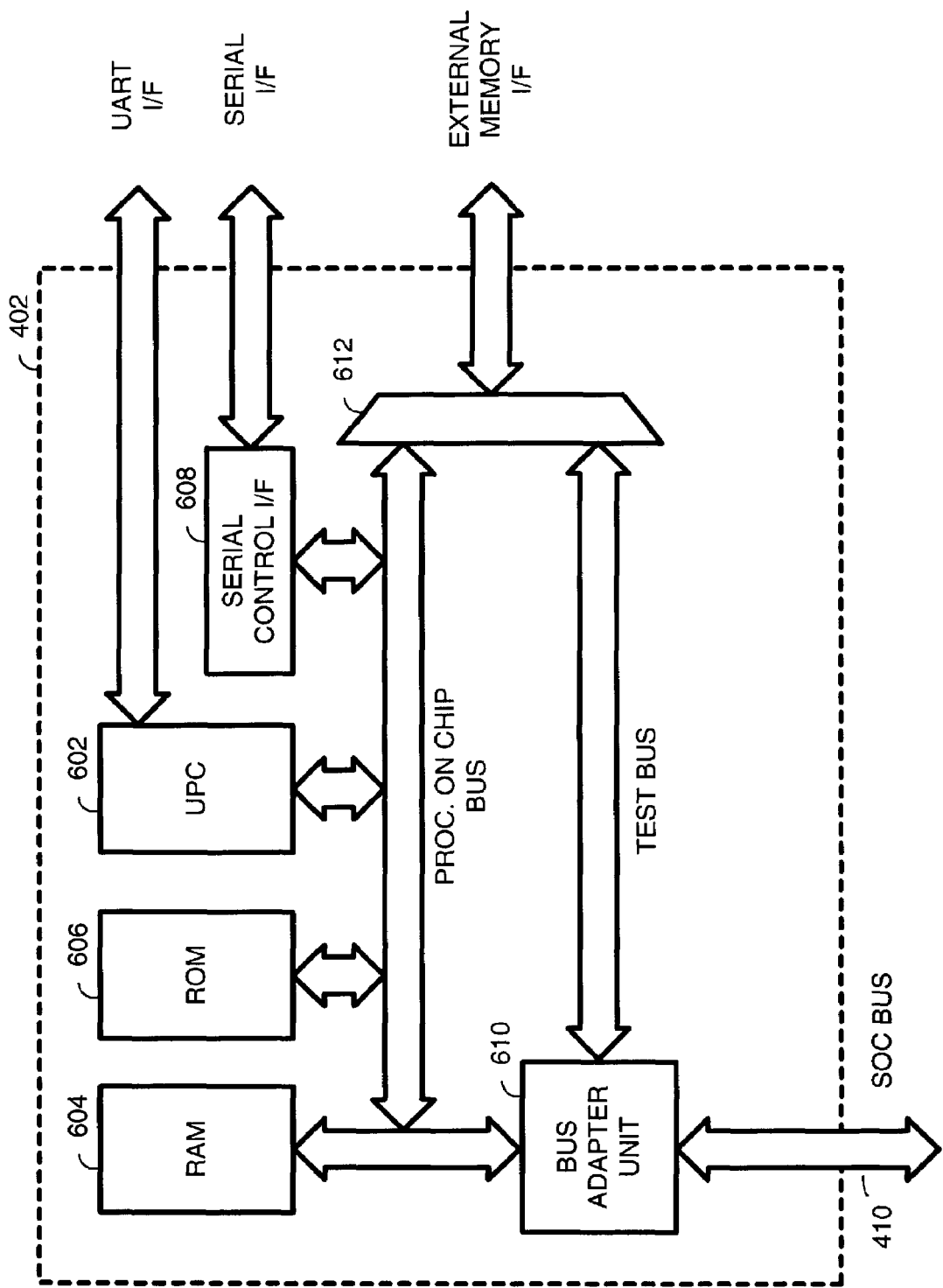
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, but adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC bus. The microprocessor core 602 includes a universal asynchronous receiver transmitter interface that allows direct access to the microprocessor core. Further, the serial control interface 608 provides a serial interface path to the processor on a chip bus.

Figure 7:
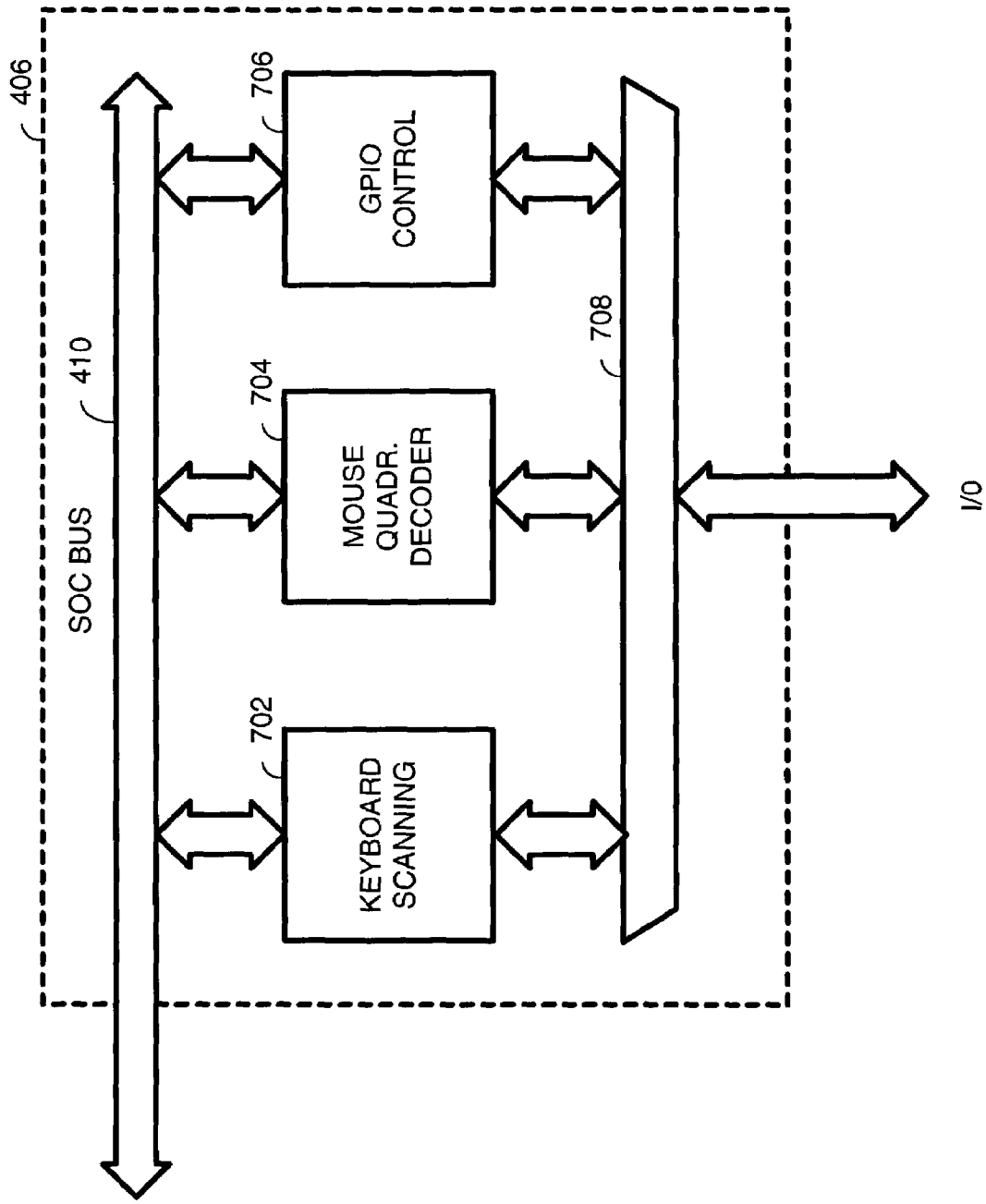
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to at least one user input device.

In another embodiment of the input/output unit 406, each of the keyboard scanning block 702, the mouse quadrature decoder block 704, and the GPIO control block 706 couples directly to external pins that couple to at least one user input device.

Figure 8:
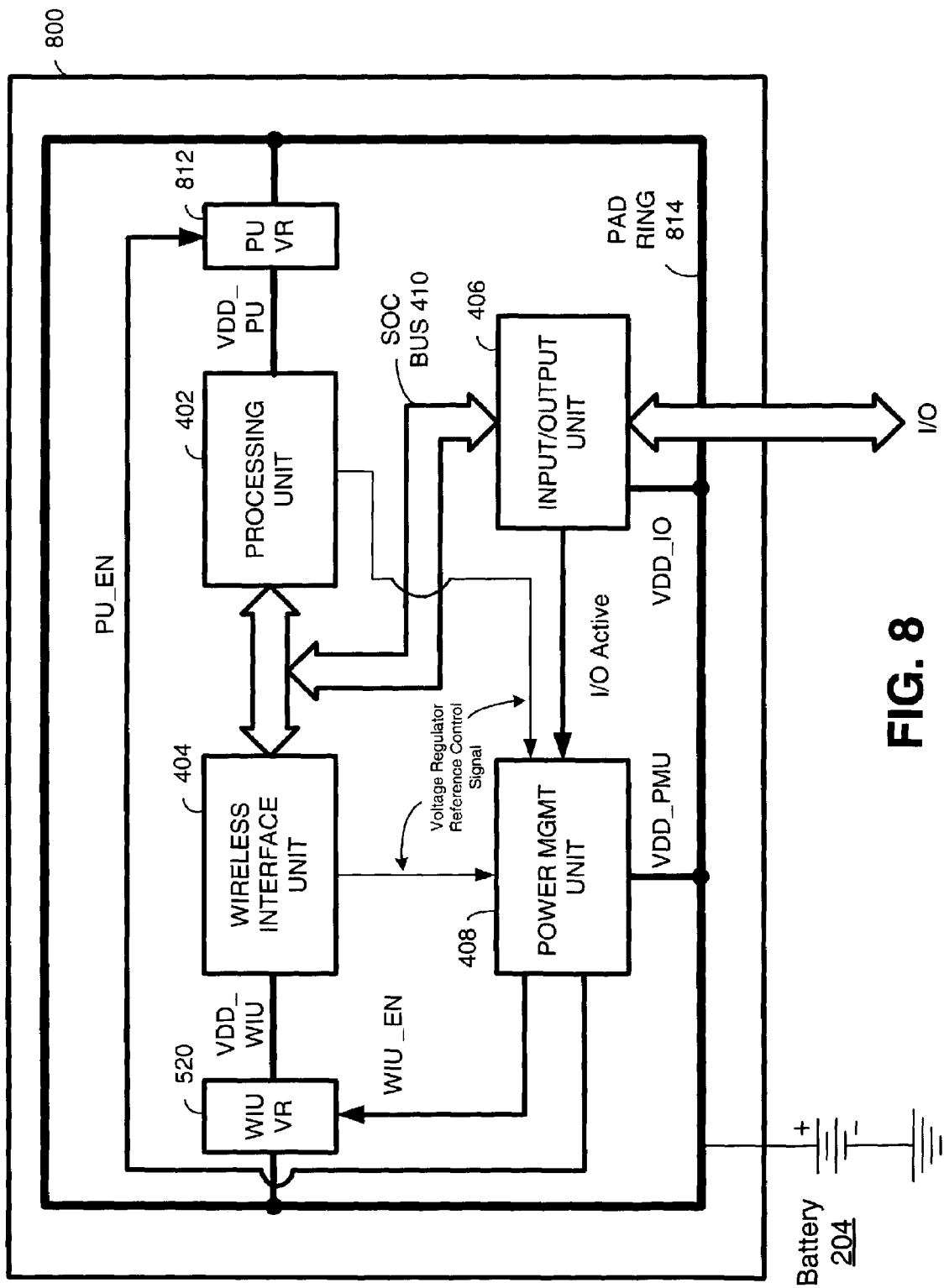
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 404, processing unit 402, input/output unit 406, and power management unit 408. The processing unit 402, wireless interface unit 404, and input/output unit 406 couple via a SOC bus 410. Further, as was previously described, input/output unit 406 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 406 and power management unit 408 couple directly to pad ring 814 to receive their power and voltage. However, processing unit 402 couples to pad ring 814 via processing unit voltage regulation circuitry 812. Further, the wireless interface unit 404 couples to pad ring 814 via wireless interface unit voltage regulation circuitry 520. The processing unit voltage regulation circuitry 812 is controlled by the power management unit 408 via control signal PU_EN. Further, the wireless interface unit voltage regulation circuitry 520 is controlled by the power management unit 408 using control signal WIU_EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention.

In busy mode mode, the Master (host computer) is actively polling the HID (wireless mouse, wireless keyboard, etc.) for data at a polling rate near 100 polls/second, or about once every 16 slots times. Continued user activity (keypad strokes, mouse motion, button presses, etc.) keeps the HID in busy mode. If there has been no activity for a few seconds (determined by particular settings), operation transition to idle mode.

In idle mode, the HID requests the master (serviced host) to enter SNIFF mode with a SNIFF interval that is chosen based on desired latency and average power consumption. In one operation, the SNIFF interval is 50 ms, or about every 80 slot times. Although the HID can transition to I/O Active immediately after an event, it may have to wait up to 100 mS to transmit its data to the host, and therefore must have enough buffer space to store 100 mS of events. If an event occurs, the HID requests the master to leave SNIFF mode. If there is no further activity for a longer period, the HID transitions from idle mode to suspend mode. Then, the HID is parked.

In suspend mode, a longer beacon interval can be used for a lower power state. When in suspend mode, any user input detected will result in the HID requesting to be unparked and transitioned back to the busy mode. When the HID is parked, it consumes less power than when the host is in SNIFF mode since the HID does not have to transmit. In suspend mode, the HID just listens to the beacons to remain synchronized to the master's frequency hopping clock. As long as the master continues transmitting (meaning the host is not turned off) the HID will remain in suspend mode. If link occurs due to the host being turned off without warning, or the host moving out of range, the Lost Link state will be entered.

According to the present invention, the power down mode is also supported. In the power down mode, the power management unit 408 operates the processing unit voltage regulation circuitry 812 and the wireless interface unit voltage regulation circuitry 520 to a power down the processing unit 402 and wireless interface unit 404, respectively. These states of operation will be described further with reference to FIGS. 9 and 10.

Figure 9:
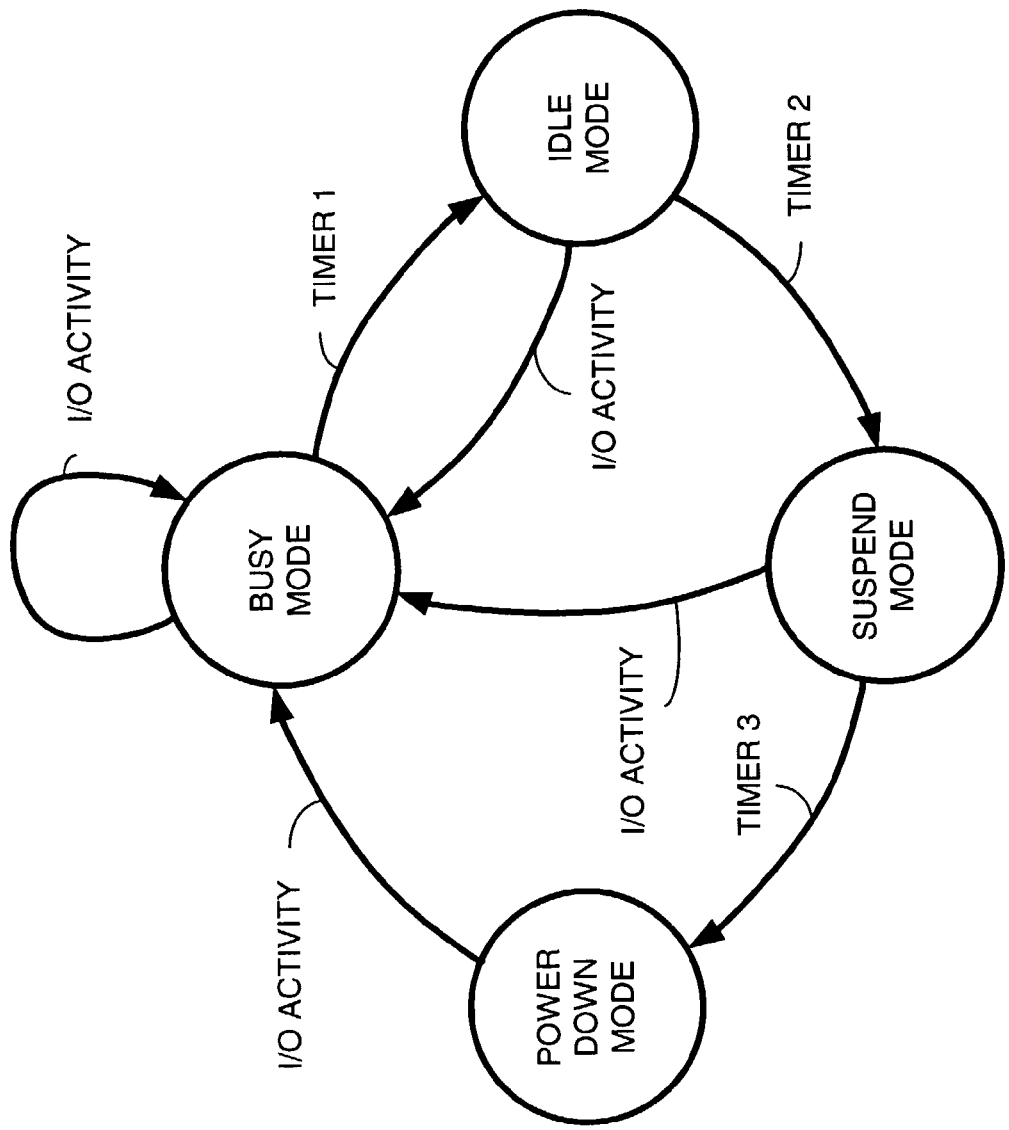
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode and, the power down mode. The state diagram of FIG. 9 shows how each of these modes is reached during normal operation.

When the wireless interface device is initially powered up, it enters the busy mode of operation. In the busy mode of operation, all features and wireless operation of the wireless interface device as enabled. As long as I/O activity continuous, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

Figure 10:
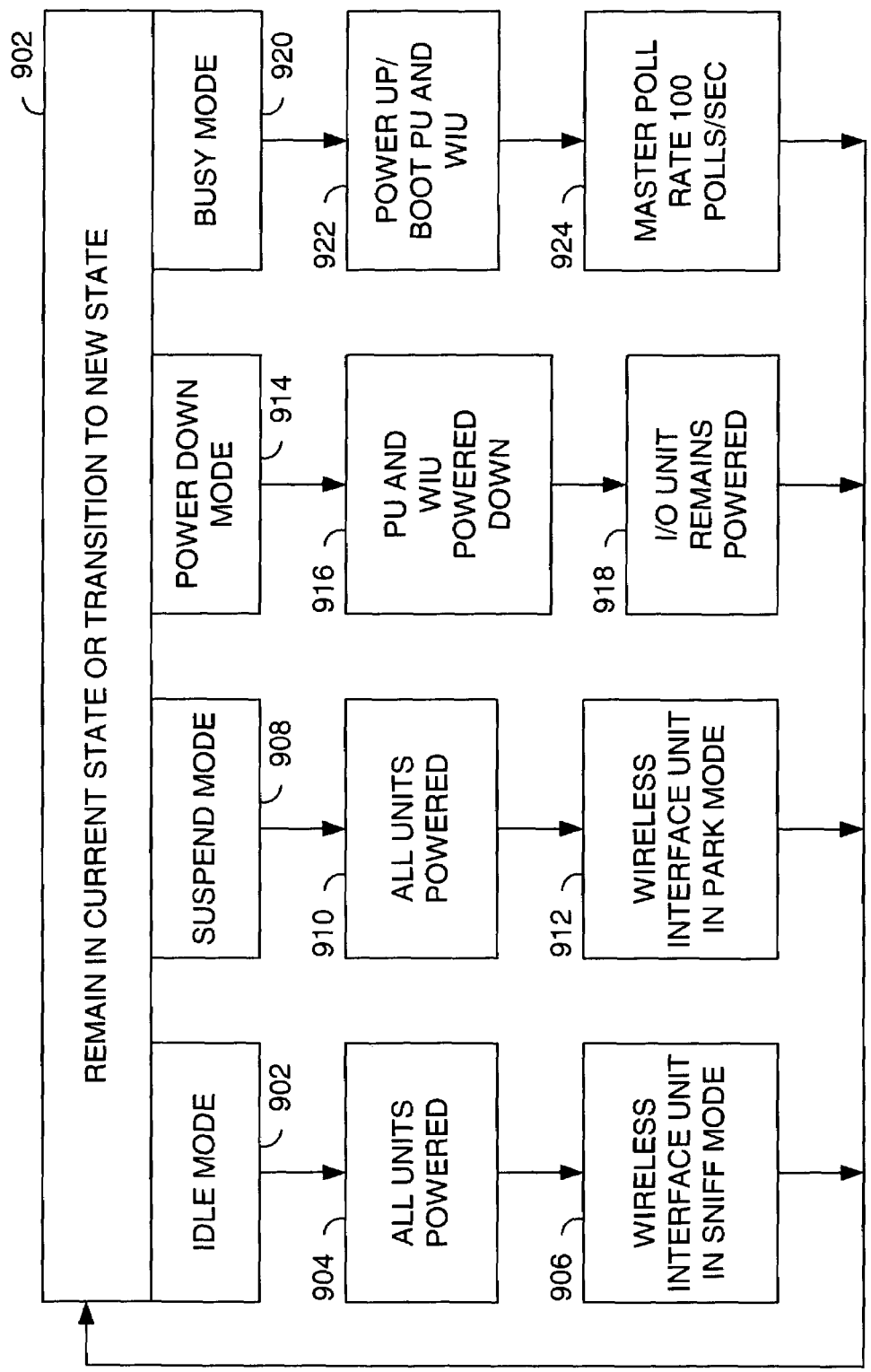
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 902).

When power conservation operation occurs to move from the busy mode to the idle mode (step 902), all portions of the wireless interface device remain powered (step 904). However, in the idle mode, the wireless interface unit enters a sniff mode in which some of its operations are reduced. Such operations were previously described with reference to FIG. 9. Further, additional information regarding this mode is available in the Bluetooth HID standard.

When the operation of the wireless interface device transitions from the idle mode of the suspend mode (step 908) all portions of the wireless interface device remain powered (step 910). However, the wireless interface unit of the wireless interface device enters the park mode, which consumes even less power than does the wireless interface unit when in the sniff mode.

When in the suspend mode if an additional timer or inactivity period expires, the wireless interface device will transition in the power down mode (step 914). In the power down mode, the processing unit and wireless interface until will be powered down (step 916). This power down operation will be performed in one embodiment by simply disconnecting a voltage source from the processing unit and the wireless interface unit. One such technique for doing this is described with reference to FIG. 8. In the power down mode, the I/O unit will continue to the powered to allow it to sense the state of the user input device lines.

Finally, from any of the reduced power operating states, when I/O activity is sensed by the input/output unit 406, the wireless input device will transition back to the busy mode (step 920). When such operation occurs, if the components have been powered down, they will be powered up and will go through their boot operations (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11:
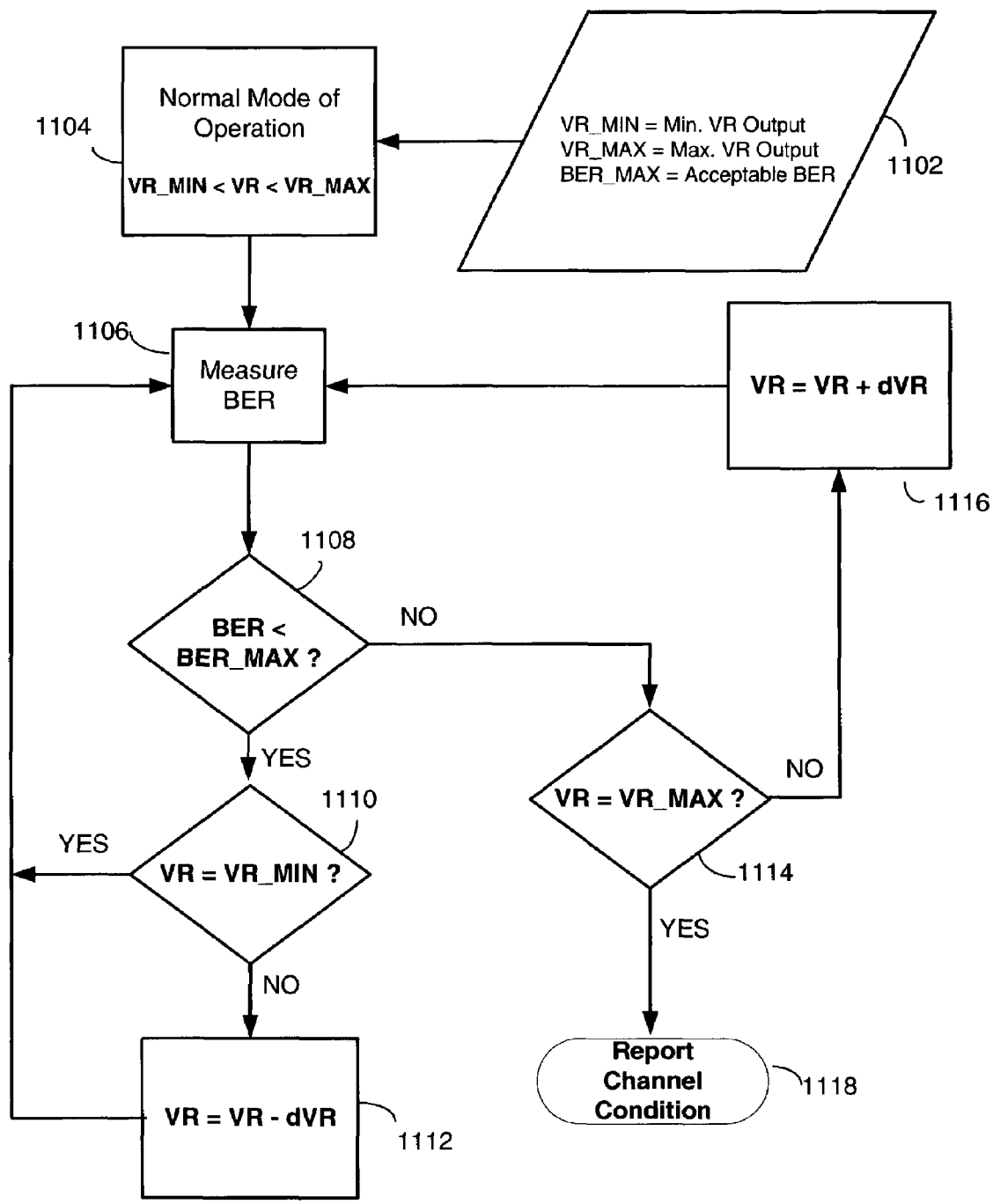
FIG. 11 is a flowchart illustrating the processing steps implemented by the wireless interface to maintain the bit error rate at an acceptable level by dynamically regulating the voltage levels of the various system components.

Operation the system for using bit error rate to provide power management in a wireless interface device can be understood by referring to the flow chart of FIG. 11 and the related system components shown in FIG. 5 and FIG. 8. Referring to FIG. 11, in step 1102, operating parameters are specified. VR_MIN is the minimum acceptable level of voltage regulator output and VR_MAX is the maximum acceptable level of voltage regulator output. BER_MAX represents the maximum acceptable value of bit error rate. In step 1104, the system enters the normal mode of operation with the voltage regulator output VR less than the maximum VR_MAX and greater than the minimum VR_MIN. In step 1106, the bit error rate is measured and a test is conducted in step 1108 to determine whether the current bit error rate, BER, is less than the maximum bit error rate BER_MAX. If the result of the test in step 1108 indicates that the bit error rate is less than the maximum acceptable bit error rate, BER_MAX, processing proceeds to step 1110 where a test is conducted to determine whether the value of the voltage regulator output VR is equal to the minimum acceptable voltage regulator output, VR_MIN. If the result of the test conducted in step 1110 indicates that the voltage regulator output is equal to the minimum acceptable voltage regulator output, processing proceeds to step 1106, where the bit error rate is measured again. If, however, the result of the test conducted in step 1110 indicates that the voltage regulator output is not equal to the minimum acceptable voltage regulator output, processing proceeds to step 1112 where the voltage regulator output is decreased by a predetermined amount, dVR. Processing then returns to step 1106 where the bit error rate is measured again.

If the test conducted in step 1108 indicates that the bit error rate BER is not less than the maximum bit error rate, BER_MAX, processing proceeds to step 1114 where a test is conducted to determine if the voltage regulator output, VR, is equal to the maximum acceptable voltage regulator output, VR_MAX. If the test conducted in step 1114 indicates that the voltage regulator output is equal to the maximum voltage regulator output, processing proceeds to step 1118 where the channel condition is reported. If, however, the test conducted in step 1114 indicates that the voltage regulator output is not equal to the maximum acceptable voltage regulator output, processing proceeds to step 1116 where the voltage regulator output is increased by in increment, dVR, and processing returns to step 1106 where the bit error rate is measured again.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternative falling within the spirit and scope of the present invention as defined by the claims.

The invention claimed is:

1. A system for dynamically regulating voltage in a data communications system, comprising:
   a data unit operable to generate a data stream;
   a bit error detection unit communicatively coupled to the data unit, wherein the bit error detection unit is operable to generate an error signal indicating a bit error rate in the data stream;
   a processing unit operably coupled to the data unit and the bit error detection unit, wherein the processing unit to process the error signal to determine if the bit error rate is less than a maximum acceptable value and to generate a voltage regulation reference signal to incrementally decrease a voltage level provided to the data unit if the bit error rate is less than the maximum acceptable value, until the maximum acceptable value or a minimum voltage level is reached, but if the bit error rate is not less than the maximum acceptable value, the processing unit to generate the voltage regulation reference signal to incrementally increase the voltage level provided to the data unit until the maximum acceptable value or a maximum voltage level is reached, the processing unit to continually monitor the error signal to increase or decrease the voltage level provided to the data unit to maintain the voltage level at the maximum acceptable value for the bit error rate; and
   a power management unit operably coupled to the data unit, and the processing unit, wherein the power management unit uses the voltage regulation reference signal to control the voltage level provided to the data unit to maintain the bit error rate at the maximum acceptable value.

2. The system of claim 1, further comprising a voltage regulation circuitry that couples the data unit to a voltage source, wherein the power management unit generates voltage level control signals to control the operation of the voltage regulation circuitry to controllably power the data unit.

3. The system of claim 1, wherein the system for dynamically regulating voltage operates in conjunction with a wireless device having a wireless interface unit and wherein the wireless interface unit enters one of a plurality of power consumption operating states, comprising:
   busy mode in which all components of the wireless interface unit are powered and operational;
   idle mode in which the wireless interface unit performs first power conserving operations;
   suspend mode in which the wireless interface unit performs second power conserving operations; and
   power down mode in which the wireless interface unit and the processing unit are powered down.

4. The system of claim 3, wherein when in the idle mode the wireless interface device periodically communicates with a wirelessly enabled host.

5. The system of claim 4 wherein when in the suspend mode;
   the wireless interface unit does not transmit to the wirelessly enabled host; and
   the wireless interface unit listens to the transmission of the wirelessly enabled host.

6. A system for dynamically regulating voltage in a wireless interface device that services communications between a wirelessly enabled host and at least one user input device, comprising:
   a wireless interface unit that wirelessly interfaces with the wirelessly enabled host via a data stream;
   a bit error detection unit in the wireless interface unit, the bit error detection unit being operable to generate an error signal indicating a bit error rate in the data stream;
   a processing unit operably coupled to the wireless interface unit and the bit error detection unit, wherein the processing unit to process the error signal to determine if the bit error rate is less than a maximum acceptable value and to generate a voltage regulation reference signal to incrementally decrease a voltage level provided to the wireless interface unit if the bit error rate is less than the maximum acceptable value, until the maximum acceptable value or a minimum voltage level is reached, but if the bit error rate is not less than the maximum acceptable value, the processing unit to generate the voltage regulation reference signal to incrementally increase the voltage level provided to the wireless interface unit until the maximum acceptable value or a maximum voltage level is reached, the processing unit to continually monitor the error signal to increase or decrease the voltage level provided to the data unit to maintain the voltage level at the maximum acceptable value for the bit error rate; and
   a power management unit operably coupled to the wireless interface unit, the processing unit, and the bit error detection unit, wherein the power management unit uses the voltage regulation reference signal to generate voltage level control signals to control the voltage level provided to the wireless interface unit to maintain the bit error rate at the maximum acceptable value.

7. The system of claim 6, further comprising a voltage regulation circuitry that couples the data unit to a voltage source, wherein the power management unit controls the operation of the voltage regulation circuitry to controllably power the data unit.

8. The system of claim 6, wherein the wireless interface device enters one of a plurality of power consumption operating states comprising:
   busy mode in which all components of the wireless interface device are powered and operational;
   idle mode in which the wireless interface unit performs first power conserving operations;
   suspend mode in which the wireless interface unit performs second power conserving operations; and
   power down mode in which the wireless interface unit and the processing unit are powered down.

9. The system of claim 8, wherein when in the idle mode the wireless interface unit periodically communicates with the wirelessly enabled host.

10. The system of claim 9 wherein when in the suspend mode:
    The wireless interface unit does not transmit to the wirelessly enabled host; and
    the wireless interface unit listens to the transmissions of the wirelessly enabled host.

11. A method for dynamically regulating voltage in a data communications system, comprising:
    generating a data stream from a data unit;
    monitoring the bit error rate of the data stream and generating an error signal indicating a bit error rate in the data stream;
    processing the error signal to determine if the bit error rate is less than a maximum acceptable value and generating a voltage regulation reference signal to incrementally decrease a voltage level provided to the data unit if the bit error ate is less than the maximum acceptable value, until the maximum acceptable value or a minimum voltage level is reached, but if the bit error rate is not less than the maximum acceptable value, generating the voltage regulation reference signal to incrementally increase the voltage level provided to the data unit until the maximum acceptable value or a maximum voltage level is reached, the processing to continually monitor the error signal to increase or decrease the voltage level provided to the data unit to maintain the voltage level at the maximum acceptable value for the bit error rate; and
    using the voltage regulation reference signal to generate voltage level control signals to control the voltage level provided to the data unit to maintain the bit error rate at the maximum acceptable value.

12. A system the services communications between a wirelessly enabled host and at least one user input device, comprising:
    a wireless interface unit that wirelessly interfaces with the wirelessly enabled host via a data stream;
    a processing unit operably coupled to the wireless interface unit;
    an input/output unit operably coupled to the wireless interface unit and to the processing unit, wherein the input/output unit also operably couples to the user input device; and
    a dynamic voltage regulation system, comprising:
       a bit error detection unit operable to generate an error signal indicating a bit error rate in the data stream;
       wherein the processing unit is operably coupled to the bit error detection unit, wherein the processing unit to process the error signal to determine if the bit error rate is less than a maximum acceptable value and to generate a voltage regulation reference signal to incrementally decrease a voltage level provided to the wireless interface unit if the bit error rate is less than the maximum acceptable value, until the maximum acceptable value or a minimum voltage level is reached, but if the bit error rate is not less than the maximum acceptable value, the processing unit to generate the voltage regulation reference signal to incrementally increase the voltage level provided to the wireless interface unit until the maximum acceptable value or a maximum voltage level is reached, the processing unit to continually monitor the error signal to increase or decrease the voltage level provided to the data unit to maintain the voltage level at the maximum acceptable value for the bit error rate; and a power management unit operably coupled to the processing unit, and the bit error detection unit, wherein the power management unit uses the voltage regulation reference signal to generate voltage level control signals to control the voltage level provided to the wireless interface unit to maintain the bit error rate at the maximum acceptable value.

13. The system of claim 12, wherein the power management unit powers down the wireless interface unit and the processing unit after at least one inactivity period during which the user input device is inactive with respect to the input/output unit.

14. The system of claim 12, wherein the power management unit controls the power consumption of the system by:
   powering down the wireless interface unit and the processing unit during reduced power operations; and
   based upon notification received from the input/output unit indicating activity by the user input device, powering up the wireless interface unit and the processing unit.

15. The system of claim 12, wherein the system enters one of a plurality of power consumption operating states comprising:
   busy mode in which all components of the wireless interface device are powered and operational;
   idle mode in which the wireless interface unit performs first power conserving operations;
   suspend mode in which the wireless interface unit performs second power conserving operations; and
   power down mode in which the wireless interface unit and the processing unit are powered down.

16. An integrated circuit, comprising:
   a data unit operable to generate a data stream;
   a bit error detection unit communicatively coupled to the data unit, wherein the bit error detection unit is operable to generate an error signal indicating a bit error rate in the data stream;
   a data processing unit operably coupled to the data unit and the bit error detection unit, wherein the data processing unit to process the error signal to determine if the error rate is less than a maximum acceptable value and to generate a voltage regulation reference signal to incrementally decrease a voltage level provided to the data unit if the bit error rate is less than the maximum acceptable value, until the maximum acceptable value or a minimum voltage level is reached, but if the bit error rate is not less than the maximum acceptable value, the processing unit to generate the voltage regulation reference signal to incrementally increase the voltage level provided to the data unit until the maximum acceptable value or a maximum voltage level is reached, the processing unit to continually monitor the error signal to increase or decrease the voltage level provided to the data unit to maintain the voltage level at the maximum acceptable value for the bit error rate;

a power management unit operably coupled to the data unit, the data processing unit, and the bit error detection unit, wherein the power management unit uses the voltage regulation reference signal to generate voltage level control signals; and a voltage regulation circuitry that couples the data unit to a voltage source, wherein the voltage regulation circuitry uses the voltage level control signals to control the voltage level provided to the data unit to maintain the bit error rate at the maximum acceptable value.

17. The integrated circuit of claim 16, further comprising a wireless interface unit that provides an interface between the integrated circuit and a wirelessly enabled host.

18. The integrated circuit of claim 17, wherein the power management unit powers down the wireless interface unit and the processing unit after at least one inactivity period during which the user input device is inactive with respect to the input/output unit.

19. The integrated circuit of claim 17, wherein the power management unit controls the power consumption of the integrated circuit by:
   powering down the wireless interface unit and the processing unit during reduced power operations; and
   based upon notification received from the input/output unit indicating activity by the user input device, powering up the wireless interface unit and the processing unit.

20. The integrated circuit of claim 17, wherein the integrated circuit enters one of a plurality of power consumption operating states comprising:
   busy mode in which all components of the wireless interface device are powered and operational;
   idle mode in which the wireless interface unit performs first power conserving operations;
   suspend mode in which the wireless interface unit performs second power conserving operations; and
   power down mode in which the wireless interface unit and the processing unit are powered down.

21. A system for dynamically regulating voltage in a data communications system, comprising:
   means for generating a data stream;
   means for monitoring a bit error rate of the data stream and generating an error signal indicating the bit error rate in the data stream;
   means for processing the error signal to determine if the bit error rate is less than a maximum acceptable value and to generate a voltage regulation reference signal to incrementally decrease a voltage level provided to the means for generating the data stream if the bit error rate is less than the maximum acceptable value, until the maximum acceptable value or a minimum voltage level is reached, but if the bit error rate is not less than the maximum acceptable value, the means for processing to generate the voltage regulation reference signal to incrementally increase the voltage level provided to the means for generating the data stream until the maximum acceptable value or a maximum voltage level is reached, the means for processing to continually monitor the error signal to increase or decrease the voltage level provided to the means for generating the data stream to maintain the voltage level at the maximum acceptable value for the bit error rate; and means for generating a voltage level control signal, based on the voltage regulation reference signal, to control the voltage level provided to the means for generating a data stream to maintain the bit error rate at the maximum acceptable value.

* * * * *

UNITED STATES PATENT AND TRADEMARK OFFICE
CERTIFICATE OF CORRECTION

PATENT NO.        : 7,073,080 B2
APPLICATION NO.   : 10/329728
DATED             : July 4, 2006
INVENTOR(S)       : Wenkwei Lou It is certified that error appears in the above-identified patent and that said Letters Patent is hereby corrected as shown below:

Column 8, line 66, in Claim 1: replace "unit, and the processing unit," with --unit and the processing unit,--.

Column 10, line 22, in Claim 10: change "The" to --the--.

Column 10, line 36, in Claim 11: replace "bit error ate" with --bit error rate--.

Column 11, line 59, in Claim 16: replace "the error rate" with --the bit error rate--.

Signed and Sealed this

Twenty-third Day of December, 2008

JON W. DUDAS
*Director of the United States Patent and Trademark Office*